M. G. MARKHAM.
BOOKRACK.
APPLICATION FILED MAY 17, 1920.

1,363,138.

Patented Dec. 21, 1920.
2 SHEETS—SHEET 1.

Murtyn G. Markham
INVENTOR

BY Victor J. Evans
ATTORNEY

M. G. MARKHAM.
BOOKRACK.
APPLICATION FILED MAY 17, 1920.
1,363,138.
Patented Dec. 21, 1920.
2 SHEETS—SHEET 2.
*Fig. 3.*
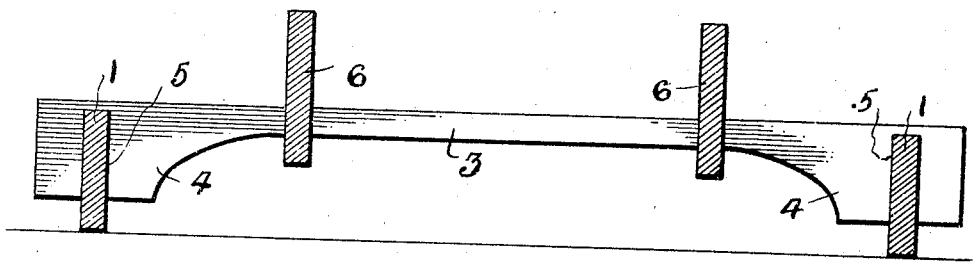
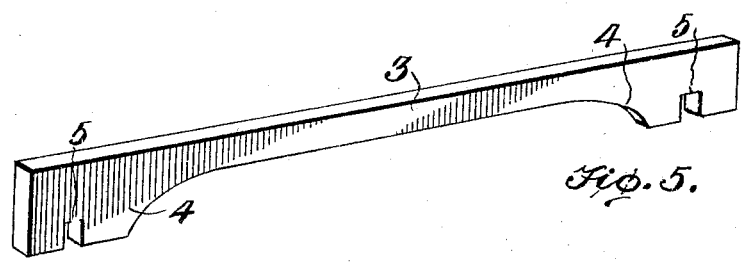
*Fig. 5.*
*Fig. 4.*  *Fig. 6.*
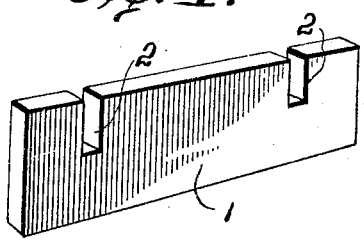 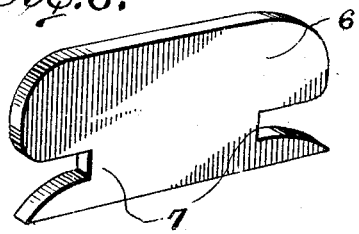
Murlyn G. Markham
INVENTOR
BY Victor J. Evans
ATTORNEY

UNITED STATES PATENT OFFICE.

MURTYN G. MARKHAM, OF ALMA, MICHIGAN.

BOOKRACK.

1,363,138.  Specification of Letters Patent.  Patented Dec. 21, 1920.

Application filed May 17, 1920. Serial No. 381,948.

*To all whom it may concern:*

Be it known that I, MURTYN G. MARKHAM, a citizen of the United States, residing at Alma, in the county of Gratiot and State of Michigan, have invented new and useful Improvements in Bookracks, of which the following is a specification.

An object of this invention is the production of a supporting rack for books in which slidable members are employed for contacting with the books on the rack for effectively sustaining said books on said rack.

A further object is the production of a book rack which is of a collapsible nature, easily knocked down or set up, and wherein one or a plurality of books may be effectively clamped on the rack.

A further object is the production of a book rack of a simple, cheap, and efficient nature.

The foregoing objects, and others which will appear as the nature of the invention is better understood, may be accomplished by a construction, combination and operative arrangement of parts, such as is disclosed by the drawings.

In the drawings:—

Fig. 3 is an approximately central vertical longitudinal sectional view through the improvement.

Fig. 4 is a perspective view of one of the end members of the base.

Fig. 5 is a similar view of one of the side members of the base.

Fig. 6 is a similar view of one of the book enaging or clamping plates.

Figure 1:
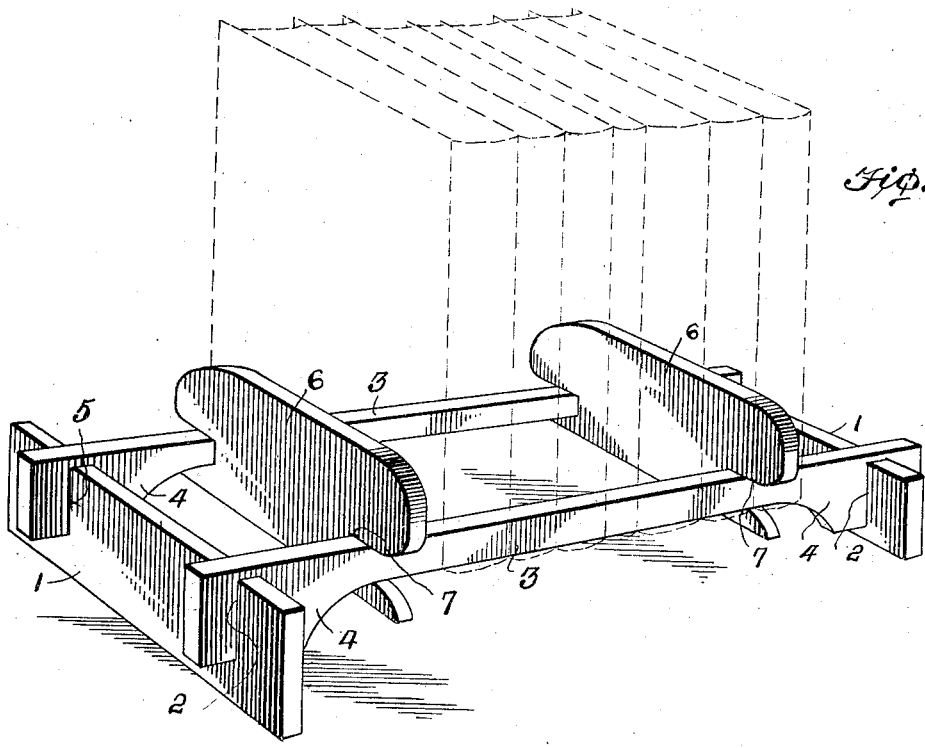
Figure 1 is a perspective view of a book rack constructed in accordance with this invention.
Figure 2:
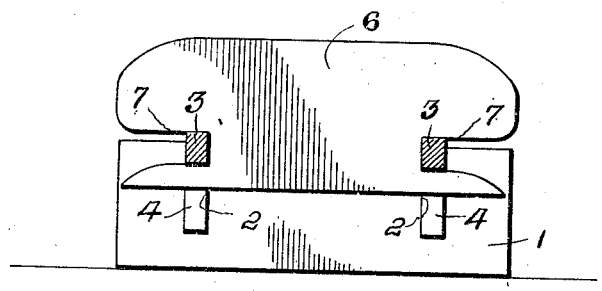
Fig. 2 is a transverse sectional view in a line with one of the book clamping plates.

The end members of the base of my improved book rack are each of a similar construction and each comprises a substantially rectangular plate 1. The plates 1, adjacent to their upper corners are notched as at 2. The side members of the base are of a similar formation and are each in the nature of a rail 3. Each rail 3, adjacent to its outer end is widened from one of its edges as at 4, and each of the said widened portions is notched as at 5. The notches 5 are designed to be received in the notches 2 of the end members 1, and the opposite walls provided by the respective notches are designed for contacting engagement with the opposite faces of the end members and rails. The inner walls provided by the coengaging notched portions of the end rails, of course contact with each other. By this arrangement it will be seen that while the base is of a knock down construction, the same, when set up will be sustained in a strong and efficient manner.

Slidable on the rails 3, between the ends 1 are the book engaging or clamping members 6. These members are each in the nature of a substantially rectangular plate, each of the said plates being notched, as at 7, from its ends, and the notched portions of the clamping plate 6 receiving the rails 3. The engagement between the walls of the notches 7 and the surface of the rails with which they contact may exert a sufficient friction between such contacting portions as to prevent the free sliding of the clamping plates on the rails, but, of course, the notches may be of such size and shape to permit of a slight tilting or canting of the clamping plates on the rails. In either event the clamping plates will effectively hold therebetween a book or a number of books that rest on the rails of the base.

The device may be constructed of any desired material, and may be ornamented. The clamping plates may be inserted on the rails by first arranging the same longitudinally between the rails and then turning the said clamping plates so that their notched portions 7 will receive the rails 3, and when so positioned the clamping plates will be disposed at a right angle with respect to the longitudinal plane of the base of the rails 3. The clamping plates may be removed by simply reversing this operation. When collapsed, the book rack is made into a small compact bundle so that the same can be conveniently shipped or stored, and it is thought that the foregoing description, when taken in connection with the drawings will amply set forth the construction and advantages of the improvement.

Having thus described the invention, what I claim is:—

A collapsible book rack comprising a base constituting notched ends and rails which are notched adjacent to their ends, and the notched portions of the rails designed to be received in the notched portions of the ends, said rails being widened at the notched portions thereof, clamping plates slidable on the rails, each of said plates having its ends notched, and each of said notches receiving therein one of the rails.

In testimony whereof I affix my signature.

MURTYN G. MARKHAM.